Patented May 19, 1953

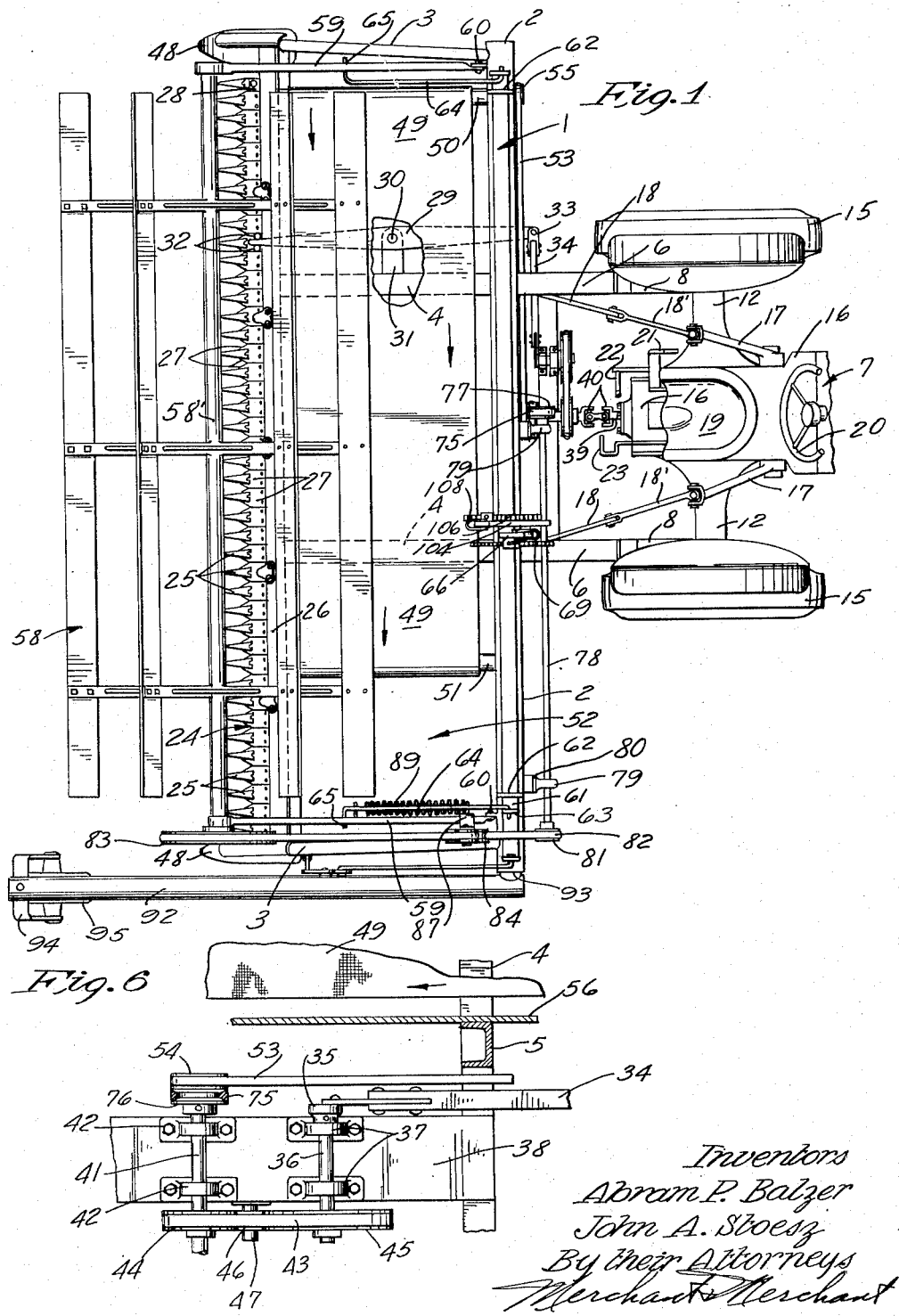

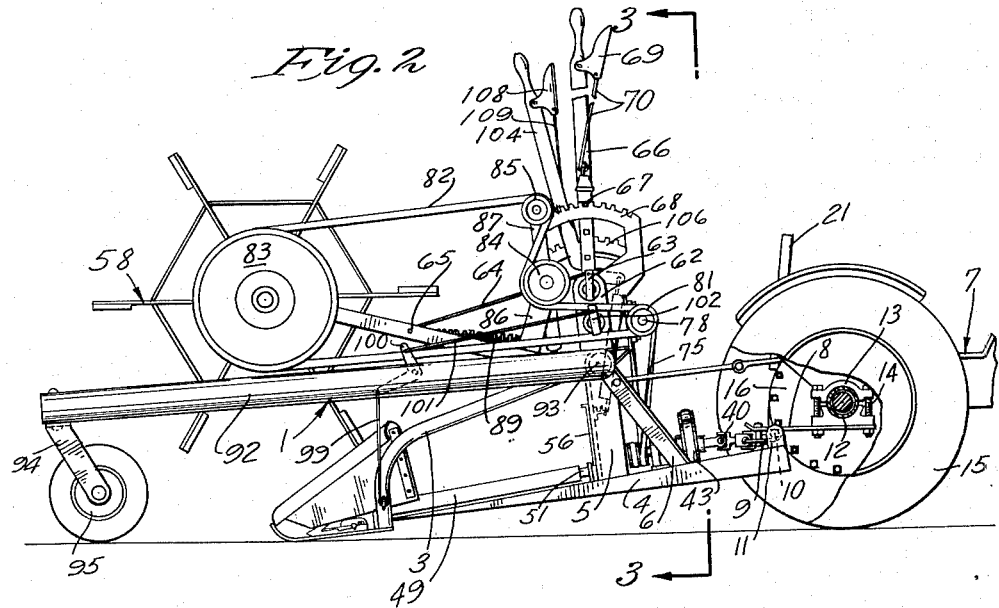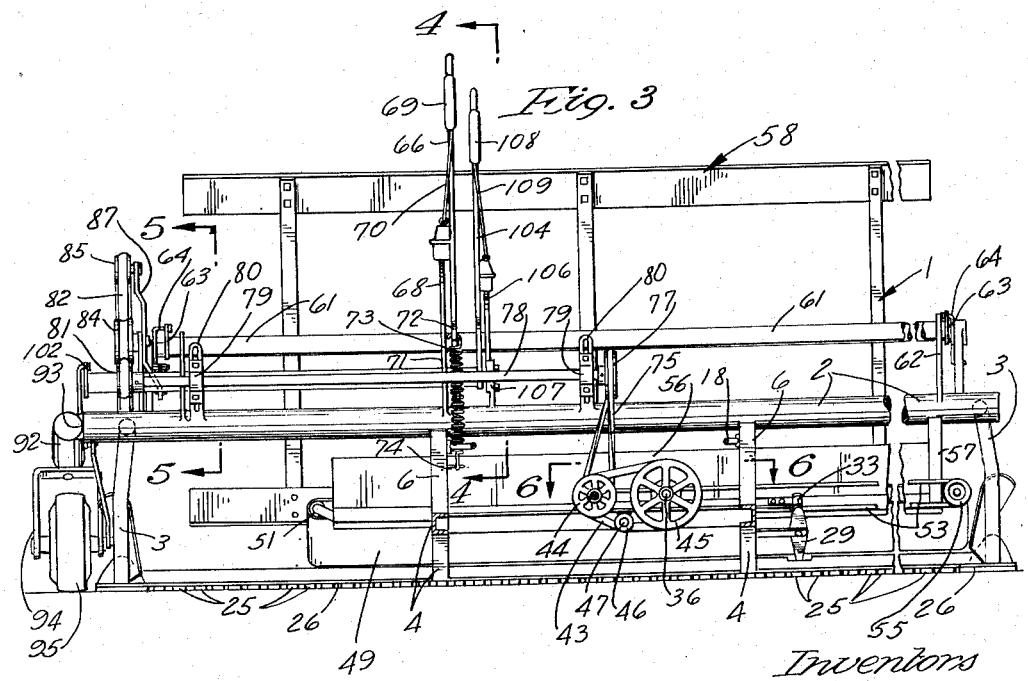

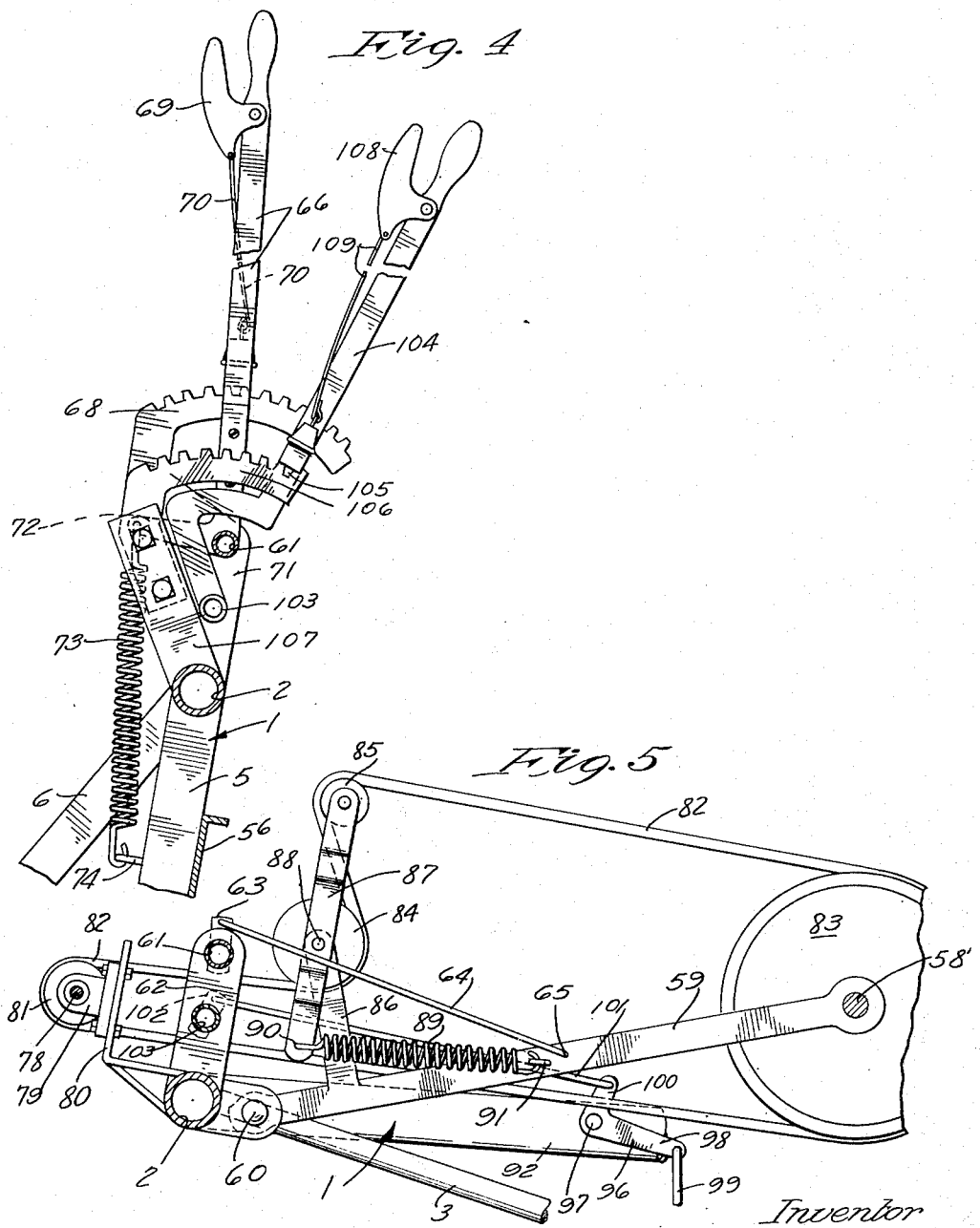

2,638,728

UNITED STATES PATENT OFFICE 2,638,728

SWATHER PLATFORM ADJUSTING MEANS

Abram P. Balzer and John A. Stoesz,
Mountain Lake, Minn.

Application March 20, 1950, Serial No. 150,654

1 Claim. (Cl. 56—208)

Our invention relates generally to agricultural implements and, more specifically, to swathers or windrowers of the type which are adapted to be mounted on a tractor or like vehicle for travel therewith through a field.

An important object of our invention is the provision of novel means whereby the cutter of a swather is maintained at a predetermined level above the ground as the swather is moved over uneven terrain, so that the cutter is prevented from digging into the ground and being dulled or otherwise damaged.

Another object of our invention is the provision of novel means whereby the level of the cutter in a swather of the above type may be readily adjusted so as to cut grain at various predetermined levels above the ground.

Another object of our invention is the provision of a device as set forth which is relatively inexpensive to produce, which is rugged in construction, and which is efficient and durable in use.

Other highly important objects and advantages of our invention will become apparent from the following detailed specification, appended claim, and attached drawings.

Referring to the drawings, wherein like characters indicate like parts throughout the several views:

Fig. 1 is a view in plan of a swather built in accordance with our invention and shown as being coupled to the rear end of a tractor, parts of which are broken away;

Fig. 2 is a fragmentary view in side elevation of the machine of Fig. 1, some parts being broken away and some parts being shown in section;

Fig. 3 is a fragmentary view, partly in vertical section and partly in elevation, taken substantially on the line 3—3 of Fig. 2;

Fig. 4 is an enlarged fragmentary detail taken substantially on the line 4—4 of Fig. 3;

Fig. 5 is an enlarged fragmentary detail taken substantially on the line 5—5 of Fig. 3; and Fig. 6 is an enlarged fragmentary view, partly in horizontal section and partly in plan, taken substantially on the line 6—6 of Fig. 3.

Preferably and as shown, our novel swather is intended to be mounted in back-to-back relationship to a tractor and operated with the tractor running in reverse to its normal direction. In the drawings, the numeral 1 indicates, in its entirety, a swather frame comprising a tubular transverse rear frame member 2, a pair of side frame members 3, and a pair of spaced intermediate base frame members 4. The base frame members 4 are rigidly secured to the transverse frame member 2 by generally upright frame members 5 and are braced by angularly-disposed brace members 6.

The swather frame 1 is adapted to be mounted on a tractor or like vehicle 7 by a pair of coupling bars 8 which are bifurcated at their rear ends, with respect to the tractor 7 as indicated at 9, to receive aligned coupling pins 10 that are mounted in brackets 11 fast on the rear ends of the base frame members 4 and suitably locked thereto. As indicated in Fig. 2, the bars 8 are rigidly secured to the axle housing 12 of the tractor 7 by means of clamping fixtures 13 and nut-equipped bolts 14. In the drawings, the rear drive wheels of the tractor are indicated by the numeral 15, the axle housing 12 being rigidly secured to the transmission casing 16 of the tractor 7 in the usual manner. A pair of conventional elevator arms 17 operated by mechanism not shown but contained within the transmission housing 16 have their free ends connected by pairs of links 18 and 18' to the upper end portions of the base members 6 (see particularly Figs. 2 and 3). It will be noted that the tractor 7 has its operator's seat 19 reversed from its usual position facing the steering wheel 20 so that the operator may be facing in the direction of the frame 1. As above noted, the tractor is to be driven in reverse to its usual direction to properly operate the swather herein described. For operating the tractor 7 with the position of the seat 19 reversed, we provide a steering lever 21 and control pedals 22 and 23 which may be coupled respectively to the steering apparatus and other control apparatus, not shown, of the tractor 7 in any suitable manner.

Mounted between the front ends of the side frame members 3 and supported intermediate its ends by the front end portions of the base frame members 4 is a conventional mower or cutter 24 which defines the leading edge of our novel swather and which includes a plurality of spaced guards or fingers 25 mounted on a finger bar 26. A plurality of knives 27 riveted or otherwise secured to a sickle bar 28 reciprocate in and between the guards 25 in the usual manner. Reciprocatory cutting movement is imparted to the sickle bar 28 and knives 27 mounted thereon by an oscillatory member or rock arm 29 pivoted intermediate its ends as indicated at 30 to a bracket 31 welded or otherwise secured to one of the base frame members 4. The forward end of the rock arm 29 operates between a pair of pins or rollers 32 mounted on the sickle bar 28. At its rear end, the rock arm 29 has pivotal engagement with a bracket 33 secured to one end of a pitman arm 34, the opposite end of which is connected with a crank wheel 35 fast on a jack shaft 36 which is journalled in bearings 37 rigidly secured to a mounting plate or the like 38 extending between the base frame members 4 rearwardly of the frame members 5. It should be obvious that rotation of the shaft 36 and crank wheel 35 mounted thereon will cause oscillatory rocking movements of the rock arm 29 through the pitman arm 34 and consequent reciprocatory movement of the several cutting knives 27. Rotary movement is imparted to the jack shaft 36 by the tractor driving mechanism, not shown, through the power take-off shaft 39 thereof and universal connections 40 connecting the power take-off shaft 39 to a driving shaft 41 journalled in bearings 42 mounted on the mounting plate 38. An endless V-belt 43 runs over a pulley 44 keyed or otherwise secured to the driving shaft 41 and a pulley 45 fast on the rear end portion of the jack shaft 36. An idler pulley 46 journalled on a stub shaft 47 adjustably mounted on the mounting plate 38 in any suitable manner, provides a take-up for slack in the V-belt 43 whereby to maintain the same under proper driving tension. A pair of skids or the like 48 are mounted on the forward ends of opposite side frame members 3 and prevent the cutter 24 from digging into the ground at any time.

For depositing material mowed by the cutter 24 in a windrow, we provide a conveyor comprising an endless conveyor belt 49 running over a drive roller 50 and an idler roller 51. The conveyor belt 49 is located directly behind the cutter 24, the drive roller 50 therefor being journalled in the frame 1 adjacent one side thereof, and the idler roller 51 being journalled in suitable bearings in the frame 1 in inwardly-spaced relationship to the opposite side thereof. The upper or delivery run of the conveyor belt 49 moves in a direction indicated by arrows in Fig. 1, whereby to deposit material carried thereby on the ground between the idler roller 51 and the adjacent side of the frame 1. The delivery end of the conveyor and the portion of the mower 24 extending therebeyond define adjacent sides of a windrow-forming opening 52 into which the material is deposited from the conveyor together with that which is cut by the mower 24 laterally outwardly of the delivery end of the conveyor belt 49. Thus, as the swather moves through a field, a windrow is formed which lies parallel to the direction of travel of the swather.

Conveying movement is imparted to the conveyor belt 49 by the drive shaft 41 through a V-belt 53 which runs over a pulley 54 fast on the drive shaft 41 and a second pulley 55 fast on the drive roller 50 of the conveyor. A wall element 56 supported by the generally upright frame members 5 and a brace member 57 prevents material on the conveyor passing rearwardly from the conveyor into the driving mechanism.

A reel 58 is journalled at its opposite ends to the outer ends of a pair of supporting arms 59 which, at their inner ends, are pivotally mounted as indicated at 60 to the tubular transverse frame member 2. Means for raising and lowering the reel 58 with respect to the cutter 24 comprises a tubular rock shaft 61 extending in spaced parallel relationship to the tubular frame member 2 and journalled in upstanding brackets or the like 62. At its opposite ends, the rock shaft 61 has welded or otherwise rigidly secured thereto a pair of crank arms 63 to the radially outer ends of each of which is pivotally mounted one end of a rigid link 64 which is pivotally connected at its opposite end to the intermediate portion of the adjacent reel-supporting arm 59, as indicated at 65. A handle lever 66 has its lower end rigidly secured to the intermediate portion of the rock shaft 61 and is provided with a conventional latch bolt element 67 which is engageable with any one of a plurality of teeth of a quadrant 68, whereby the handle lever 66 may be locked in desired set position. The latch bolt 67 is connected to a latch-operating member 69 by a link 70. The quadrant 68 is provided with a depending portion 71 which is welded or otherwise rigidly secured to the transverse frame member 2 intermediate its ends; and the handle lever 66 is conveniently located to the operator's seat 19 when the swather is operatively attached to the tractor 7. By reference to Figs. 2, 3, and 4, it will be seen that the handle lever 66 is in the form of a bell crank having a rearwardly-projecting arm 72 to the outer end of which is secured one end of a coil compression spring 73, the opposite end of which is anchored to one of the upright frame members 5, as indicated at 74. The spring 73 exerts yielding bias upon the handle member 66 in a direction to move the arms 59 and reel 58 in an upward direction, thus counterbalancing some of the load exerted thereby on the handle lever 66.

The reel 58 is driven from the drive shaft 41 through power transmission mechanism comprising a V-belt 75 running over a pulley 76 fast on the drive shaft 41 and another pulley 77 fast on one end of a jack shaft 78 in spaced parallel relationship to the transverse frame member 2 and journalled in bearings 79 mounted on brackets 80 welded or otherwise rigidly secured to the transverse frame member 2. A pulley 81 is mounted fast on the opposite end of the shaft 78 and drives a V-belt 82 which runs over a relatively large pulley 83 rigidly secured to one end of the central shaft 58' of the reel 58. For maintaining the belt 82 in a taut driving condition in all positions of the reel 58 with respect to the cutter 24, we provide belt-tensioning mechanism comprising a pair of idler pulleys 84 and 85, the former of which is journalled to a bracket member 86 extending upwardly from the adjacent supporting arm 59 and the latter of which is journalled to the upper end of a lever arm 87 which is journalled to the bracket 86 on the axis of the pulley 84, as indicated at 88. A coil tension spring 89 has one end anchored to the lower free end of the lever arm 87, as indicated at 90, and its opposite end secured to an anchor bracket or eye 91 rigidly secured to the lever arm 59 forwardly of the bracket member 86 (see particularly Fig. 5). As shown, the V-belt 82 runs over the pulleys 81, 83, and 85 with normal driving engagement. However, the belt 82 forms a reverse curve about the idler pulley 84. It will further be noted that, when the reel 58 is moved downwardly toward the cutter 24, the distance between the shafts 78 and 58' increases. As this distance increases, the idler pulley 85 is moved by belt tension in the direction of the pulley 83 against bias of the spring 89. On the other hand, upward movement of the reel 58 with respect to the cutter 24 causes the shaft 58' to move more closely to the shaft 78, whereupon the bias of the spring 89 will move the lever arm 87 and idler pulley 85 in a direction to maintain the belt 82 in a taut condition, the pulley 85 being moved in a direction away from the pulley 83.

When a swather of the type above-described has its entire weight supported by a tractor, the swather in its entirety is subject to considerable movement in a vertical plane when driven over a field having a rough or uneven terrain. For example, when the tractor moves upwardly on a short incline, the swather is lifted into the air and thereafter, when the tractor moves beyond the peak of the incline and begins its downward travel, the swather is moved rapidly downwardly toward the earth. If the downward slope of the terrain is relatively short, there is a possibility that the skids 48 and the cutter 24 may dig into the earth and cause damage to the cutter. To support the cutter and maintain the same at a predetermined level above the surface of the ground, we provide a relatively horizontally-disposed supporting leg 92 extending forwardly in the direction of travel of the swather from one end of the transverse frame member 2, as indicated at 93. The front end of the leg 92 projects forwardly of and to one side of the cutter 24 and has journalled thereto a fork 94 which carries a ground-engaging caster wheel 95. A bell crank 96 is pivoted at its intermediate portion to the leg 92 intermediate its ends, as indicated at 97, and has one arm 98 connected to the lower end portion of the adjacent end frame member 3 by a rigid link 99. The other arm 100 of the bell crank 96 has a pivotal connection with one end of a second rigid link 101, which extends generally rearwardly and is pivotally connected at its other end to the outer end portion of a crank arm 102 that is rigidly secured by welding or the like to one end of a rock shaft 103. Said rock shaft 103 is journalled in one of the upstanding brackets 62 and the bracket member 71 and terminates at the central portion of the swather in an upstanding handle lever 104. The handle 104 is provided with a conventional latch bolt element 105, which is engageable with any one of a plurality of teeth in a quadrant 106 that is rigidly mounted on the transverse frame member 2 by means of a bracket or the like 107. The latch bolt 105 is connected to a conventional latch-operating member 108 by a link 109. It will be seen, particularly by reference to Figs. 1 and 3, that the handle lever 104 is in closely spaced relationship to the handle lever 66 and conveniently located to the operator's seat 19.

Movement of the handle lever 104 from the left to the right with respect to Fig. 2 will cause the rock shaft 103 to rotate in a direction to raise the cutter 24 with respect to ground level where it may be locked in any desired position by engagement of the latch element 105 with the quadrant 106. During the operative travel of the swather through a field, the elevator arms 17 of the tractor 7 are lowered to a point where the caster wheel 95 engages the ground and all tension is removed from the links 18 and 18', so that the swather is supported by the pivotal connections 10 and by the caster wheel 95. Thus, when the swather is moved over uneven terrain, the caster wheel 95 follows the contour of the ground and raises or lowers the cutter 24 to prevent the same from undue rising and falling movements and to maintain a relatively constant level of the cutter 24 above the ground level. The leg 92 and the frame 1 are of sufficient rigidity to preclude the necessity for a support on both sides of the swather. With the structure shown, we have found that, but a single leg 92 and caster wheel 95 therefor is sufficient to maintain both ends of the cutter 24 at a common level above the ground.

Our invention has been thoroughly tested and found to be completely adequate for the accomplishment of the objectives set forth; and, while we have shown and described a commercial embodiment of our improved swather, it will be understood that the same is capable of modification without departure from the spirit and scope of the invention as defined in the claim.

What we claim is:

In a swather of the class described, a frame structure, a cutter mounted on said frame structure and defining the leading edge thereof, pivot connections at the rear portion of said frame for mounting the same to a tractor for pivotal movements of said frame structure about a horizontal axis extending transversely of the direction of travel, a horizontal forwardly extending supporting leg pivotally connected at its rear end to said frame structure for swinging movements about an axis parallel to the axis of pivotal movement of said frame structure with respect to the tractor, a ground engaging caster wheel mounted on and supporting the front end of said leg forwardly and laterally outwardly of said cutter, linkage connecting the intermediate portion of said leg with the adjacent side of said frame structure for supporting the frame structure from said leg, and manually operated means associated with said linkage for imparting pivotal movements to the frame structure about said first mentioned axis, whereby to raise and lower said cutter.

ABRAM P. BALZER.
JOHN A. STOESZ.

References Cited in the file of this patent

UNITED STATES PATENTS

| Number | Name | Date |
| --- | --- | --- |
| 991,540 | Rand | May 9, 1911 |
| 1,447,823 | Thomas | Mar. 6, 1923 |
| 2,395,672 | Kranick et al. | Feb. 26, 1946 |
| 2,501,424 | Ufer | Mar. 21, 1950 |
| 2,532,164 | Hansen et al. | Nov. 28, 1950 |